(12) United States Patent
Xu et al.

(10) Patent No.: US 10,696,594 B2
(45) Date of Patent: Jun. 30, 2020

(54) HIGH NOISE REDUCTION COEFFICIENT, LOW DENSITY ACOUSTICAL TILES

(71) Applicant: USG INTERIORS, LLC, Chicago, IL (US)

(72) Inventors: Wei Xu, Vernon Hills, IL (US); Thomas M. Mayers, Crystal Lake, IL (US); Scott C. Bakken, Cloquet, MN (US)

(73) Assignee: USG INTERIORS, LLC, Chicago, IL (US)

( * ) Notice: Subject to any disclaimer, the term of this patent is extended or adjusted under 35 U.S.C. 154(b) by 153 days.

(21) Appl. No.: 15/674,707

(22) Filed: Aug. 11, 2017

(65) Prior Publication Data

US 2019/0047914 A1    Feb. 14, 2019

(51) Int. Cl.
| | | |
|---|---|---|
| *C04B 28/14* | (2006.01) | |
| *C04B 41/00* | (2006.01) | |
| *C04B 26/06* | (2006.01) | |
| *C04B 41/45* | (2006.01) | |
| *C04B 41/61* | (2006.01) | |

(Continued)

(52) U.S. Cl.
CPC ............ *C04B 28/14* (2013.01); *B28B 11/243* (2013.01); *C04B 14/18* (2013.01); *C04B 14/46* (2013.01); *C04B 26/06* (2013.01); *C04B 41/009* (2013.01); *C04B 41/4572* (2013.01); *C04B 41/5037* (2013.01); *C04B 41/61* (2013.01); *C04B 41/68* (2013.01); *B32B 3/266* (2013.01); *C04B 2111/00603* (2013.01); *C04B 2111/12* (2013.01); *C04B 2111/52* (2013.01); *E04B 1/8404* (2013.01); *E04B 9/001* (2013.01); *E04B 9/045* (2013.01)

(58) Field of Classification Search
CPC ...... B32B 3/266; C04B 28/14; C04B 2111/52
See application file for complete search history.

(56) References Cited

U.S. PATENT DOCUMENTS

| | | |
|---|---|---|
| 3,498,404 A | 3/1970 | Roberts |
| 4,507,197 A | 3/1985 | Koenig et al. |

(Continued)

FOREIGN PATENT DOCUMENTS

EP    1158095 A2    11/2001

OTHER PUBLICATIONS

USG Ceiling Solutions, USG ASTRO® Acoustical Panels, CLIMAPLUS™ Performance, USG Corporation, 2016.

(Continued)

*Primary Examiner* — William P Watkins, III
(74) *Attorney, Agent, or Firm* — Vorys, Sater, Seymour and Pease LLP; Pradip Sahu; Brian Wishnow

(57) ABSTRACT

Acoustical tile including a dried base mat of: about 70 to about 90 wt % mineral wool; about 5 to about 15 wt % perlite; 0 to about 10 wt % starch; about 3 to about 10 wt % latex; 0 to about 5 wt % gypsum; and less than 5 wt % water. The dried base mat without including glass fibers and without a laminate layer or coating and without perforations has a NRC of about 0.70 or greater, a density of about 10 pcf to about 12 pcf, and a thickness of about ½ to about 1 inch. The acoustical tile can further include a back coating at a surface weight of about 5 grams per square foot (gsf) to about 40 gsf to the dried base mat, wherein the acoustical tile has the CAC rating of about 30 to about 35.

19 Claims, 1 Drawing Sheet

(51) Int. Cl.

| | | |
|---|---|---|
| *B28B 11/24* | (2006.01) |
| *C04B 14/18* | (2006.01) |
| *C04B 14/46* | (2006.01) |
| *C04B 41/50* | (2006.01) |
| *C04B 41/68* | (2006.01) |
| *E04B 9/00* | (2006.01) |
| *C04B 111/12* | (2006.01) |
| *E04B 1/84* | (2006.01) |
| *E04B 9/04* | (2006.01) |
| *B32B 3/26* | (2006.01) |
| *C04B 111/00* | (2006.01) |
| *C04B 111/52* | (2006.01) |

(56) References Cited

U.S. PATENT DOCUMENTS

| | | |
|---|---|---|
| 5,071,511 A | 12/1991 | Pittman |
| 5,277,762 A | 1/1994 | Felegi, Jr. et al. |
| 6,919,132 B2 | 7/2005 | Felegi, Jr. et al. |
| 7,732,043 B2 | 6/2010 | Baig et al. |
| 7,862,687 B2 | 1/2011 | Englert et al. |
| 8,062,565 B2 | 11/2011 | Mueller et al. |
| 8,563,449 B2 | 10/2013 | Mueller et al. |
| 8,945,295 B2 | 2/2015 | Brown |
| 9,040,153 B2 | 5/2015 | Yeung |
| 9,492,961 B2 | 11/2016 | Xu et al. |
| 2005/0031842 A1 | 2/2005 | Felegi, Jr. et al. |
| 2007/0277948 A1* | 12/2007 | Carbo ............... B32B 29/00 162/145 |
| 2008/0176053 A1 | 7/2008 | Miller et al. |
| 2009/0126886 A1 | 5/2009 | Englert et al. |
| 2009/0273113 A1 | 11/2009 | Baig |

OTHER PUBLICATIONS

International Search Report and Written Opinion dated Nov. 12, 2018 for PCT/US2018/045919 to United Interiors, LLC filed Aug. 9, 2018.

\* cited by examiner

HIGH NOISE REDUCTION COEFFICIENT, LOW DENSITY ACOUSTICAL TILES

FIELD OF THE INVENTION

The present disclosure relates to high noise reduction coefficient (NRC), low density acoustical tiles and panels (e.g., ceiling tiles) as well as a method of manufacture on a traditional wet felt line. More particularly, a wet felt manufacturing process using mineral wool is employed to produce smooth surface dried base mats that do not require perforating, coating, and/or laminating to achieve an NRC of about 0.70 or greater. Further, a ceiling attenuation class (CAC) rating of about 30 to about 35 can be achieved when a back coating is applied to the dried base mat.

BACKGROUND OF ART

The water felting of dilute aqueous dispersions of mineral wool and lightweight aggregate is a well-known commercial process for manufacturing acoustical tile or panels. In this process, aqueous slurry of mineral wool, lightweight aggregate, cellulose fiber, binder, and other desired ingredients is flowed onto a moving foraminous support wire, such as that of a Fourdinier or Oliver mat forming machine, for dewatering. The slurry may be first dewatered by gravity and then dewatered by vacuum suction means to form a base mat. The wet base mat is then pressed (with or without the application of additional vacuum) to the desired thickness between rolls and a support wire to remove additional water. The wet base mat is dried in heated convection drying ovens and the dried material is cut to the desired dimensions, fissured and/or perforated to impart acoustical absorbency and optionally face coated, such as with paint, to produce acoustical tiles and panels.

Mineral wool acoustical tiles are necessarily very porous to provide good sound absorption. As taught in U.S. Pat. Nos. 3,498,404; 5,047,120; and 5,558,710, all incorporated herein by reference in their entirety, mineral wool fibers have also been incorporated into the composition to improve sound absorption properties and to provide lightweight acoustical tiles or panels.

U.S. Pat. No. 5,964,934, incorporated herein by reference in its entirety, teaches the use of an expanded perlite, treated with a silicone compound to reduce its water retention, in a furnish of mineral wool, expanded perlite, cellulose fiber, and optionally a secondary binder in a water felting process to produce an acoustical tile product.

Acoustical tile composition must contain a binder, which has typically employed starch. U.S. Pat. Nos. 5,911,818 and 5,964,934, incorporated herein by reference in their entirety, suggest that as much as 15% by weight of the composition may be starch although 6-7% by weight is more normally used.

U.S. Pat. No. 5,250,153, incorporated herein by reference in its entirety, describes the use of latex binders for acoustical tile compositions and a wide variety of latex binders have been suggested for this use.

U.S. Pat. No. 6,855,753, incorporated herein by reference in its entirety, has suggested that a wet-strength resin such as a polyamine epichlorohydrin resin be used to replace conventional starch binder and that the resulting composition may be more efficiently fabricated into acoustical tiles and panels in a water felting process.

US Patent Application Publication Number 2004/209071 A1, incorporated herein by reference in its entirety, discloses a composition for slurry for manufacture of acoustical panels includes one or more fillers, one or more binders, and water and zinc pyrithione.

US Patent Application Publication Number 2005/191465 A1, incorporated herein by reference in its entirety, discloses an abuse-resistant, cast acoustical tile having improved impact resistance and excellent sound absorption values. The acoustical tiles have aggregate particles applied to the surface of a wet pulp in the casting process and the particles are embedded in the pulp by compression with a roll and/or smoothing plates.

Noise reduction coefficient (NRC) is a scale representation of the amount of sound energy absorbed upon striking a particular surface, with a NRC value of 0 indicating perfect reflection and a NRC of 1 representing perfect absorption of sound energy. The NRC value is an average of four sound absorption coefficients of the particular surface at frequencies of 250 HZ, 500 HZ, 1000 HZ, and 2000 HZ, which cover the range of typical human speech. In laboratory test of materials in a laboratory per ASTM C423-17, only the face of the sample is exposed to the sound energy, as would be the case in a typical installation. Under some circumstances NRC's greater than 1 may be obtained, but this is an artifact of the test method due to diffraction/edge to area effects.

The Ceiling Attenuation Class (CAC) rating quantifies how much sound is lost when it is transmitted through the ceiling of one room into an adjacent room through a common plenum. A higher CAC rating indicates that the ceiling system allows less sound transmission. The CAC is measured using the test standard ASTM E 1414-16, in which the sound levels are measured in the source room and an adjacent room.

There have also been attempts to produce a higher NRC product using the water felting process by lowering the stock flow of the composition in an attempt to produce a lower density product, but these attempts only produced a product that had a comparative density to conventional panels but at a reduced product thickness.

U.S. Pat. No. 7,862,687 to Englert discloses an acoustical tile composition with a high NRC of 0.80 to 0.95 achieved only by modifying the production method to eliminate the pressing of the wet base mat and utilize only vacuum for dewatering.

SUMMARY OF THE INVENTION

In general, the invention provides a dried base mat for producing acoustical tiles (i.e., prior to having perforations, lamination, or coatings) comprising mineral wool, perlite, latex, optionally starch, and optionally gypsum is provided having an NRC of about 0.70 or greater (preferably greater than 0.80), a density of about 10 to about 12 pcf, and a thickness of about ½ inch to about 1 inch. With a back coating and not necessarily a face coating, face lamination, or face perforation, a CAC rating of about 30 to about 35 can be achieved. The method of manufacture for the inventive acoustical tile follows the traditional production method where the amount of slurry used to produce a wet base mat and the pressure applied to the wet base mat during dewatering is controlled to achieve the desired density of the dried base mat. As a result, a dried base mat with a smooth surface is achieved that does not require additional processing steps of slitting, punching, coating, and/or laminating to achieve the desired acoustical and mechanical properties.

In its product respects the invention an acoustical tile comprising a dried base mat comprising:

about 70 wt % to about 90 wt % mineral wool;
about 5 wt % to about 15 wt % perlite;
0 wt % to about 10 wt % starch;
about 3 wt % to about 10 wt % latex;
0 wt % to about 5 wt % gypsum; and
less than 5 wt % water, wherein the dried base mat has an absence of glass fibers; and
wherein the dried base mat without a laminate layer or coating and without perforations has a NRC of about 0.70 or greater, a density of about 10 PCF to about 12 pcf, and a thickness of about ½ inch to about 1 inch. Optionally, the acoustical tile has an absence of one or more of the following surface treatments: laminating, face coating, back coating, and perforating.

A process for manufacturing such an acoustical tile in a water felting process comprises: mixing an aqueous slurry comprising water and ingredients comprising on a water free-basis:
about 70 wt % to about 90 wt % mineral wool,
about 5 wt % to about 15 wt % perlite,
0 wt % to about 10 wt % starch,
about 3 wt % to about 10 wt % latex, and
0 wt % to about 5 wt % gypsum,
the aqueous slurry having an absence of glass fibers;
continuously flowing the aqueous slurry onto a moving foraminous support wire to form a filter cake;
dewatering the filter cake to form a base mat which includes pressing the filter cake to the thickness of about ½ inch to about 1 inch; and
drying the base mat to produce the dried base mat that without the laminate layer or coating and without the perforations has the NRC of about 0.70 or greater, the density of about 10 pcf to about 12 pcf, and the thickness of about ½ inch to about 1 inch, wherein the aqueous slurry and the dried base mat have an absence of glass fiber. Optionally, the acoustical tile has an absence of one or more of the following surface treatments: laminating, face coating, back coating, and perforating.

Another aspect of the invention provides for an acoustical tile comprising a dried base mat comprising:
about 60 wt % to about 90 wt % mineral wool;
about 5 wt % to about 15 wt % perlite;
0 wt % to about 10 wt % starch;
about 3 wt % to about 10 wt % latex;
0 wt % to about 5 wt % gypsum;
about 0.1 wt % to about 10 wt % glass fibers; and
less than 5 wt % water; and
wherein the dried base mat without a laminate layer or coating and without perforations has a NRC of about 0.75 or greater, a density of about 10 to about 12 pcf, and a thickness of about ½ inch to about 1 inch. Optionally, the acoustical tile has an absence of one or more of the following surface treatments: laminating, face coating, back coating, and perforating.

A process for manufacturing such an acoustical tile in a water felting process comprises:
mixing an aqueous slurry comprising water and ingredients comprising on a water free-basis:
about 60 wt % to about 90 wt % mineral wool,
about 5 wt % to about 15 wt % perlite,
0 wt % to about 10 wt % starch,
about 3 wt % to about 10 wt % latex,
0 wt % to about 5 wt % gypsum, and
about 0.1 wt % to about 10 wt % glass fibers;
continuously flowing the aqueous slurry onto a moving foraminous support wire to form a filter cake;
dewatering the filter cake to form a base mat which includes pressing the filter cake to the thickness of about ½ inch to about 1 inch; and drying the base mat to produce the dried base mat that without the laminate layer or coating and without the perforations has the NRC of about 0.75 or greater, and the thickness of about ½ inch to about 1 inch.

Advantages of the present invention may become apparent to those skilled in the art from a review of the following detailed description, taken in conjunction with the examples, and the appended claims. It should be noted, however, that while the invention is susceptible of examples in various forms, described hereinafter are specific examples of the invention with the understanding that the present disclosure is intended as illustrative, and is not intended to limit the invention to the specific examples described herein.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques

DETAILED DESCRIPTION OF THE INVENTION

All percentages and ratios used herein, unless otherwise specified, are by weight (i.e., wt %) unless otherwise indicated.

Figure 1:
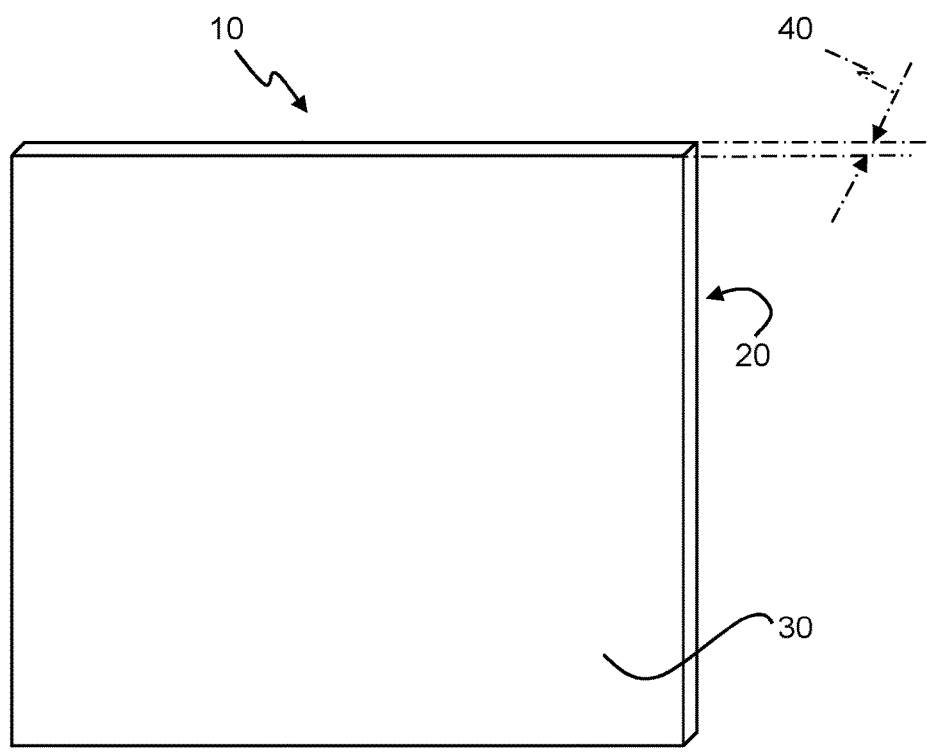
FIG. 1 shows an acoustical ceiling tile of the present invention.

FIG. 1 shows an acoustical ceiling tile 10 of the present invention having a back 20, a face 30 (sometimes referred to as a top), which is the surface positioned toward the inside of a room in which the ceiling tile 10 is installed, and a thickness 40.

Figure 2:
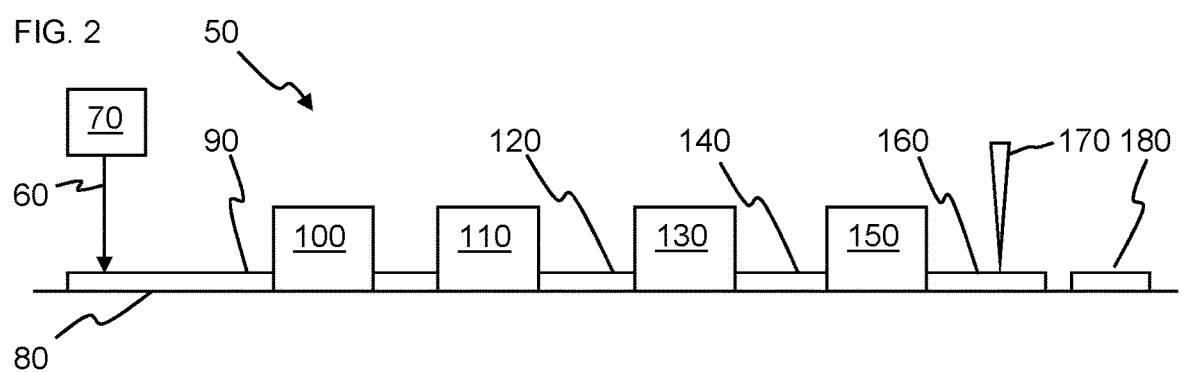
FIG. 2 schematically shows a water felting line to make the acoustical tile of the present invention.

FIG. 2 schematically shows a water felting line 50 to make the dried base mat 160 and acoustical tile of the present invention. As shown in FIG. 2, in the process, the aqueous slurry 60 of the composition is flowed from an agitated holding tank 70 (also referred to in the art as a headbox) onto a moving foraminous support wire 80 where it forms a filter cake 90 that is dewatered, first by gravity in gravity dewatering unit 100 and then by vacuum in vacuum dewatering unit 110. The speed of the moving foraminous support wire 80 and amount of aqueous slurry 60 flowed from an agitated holding tank 70 should be adjusted to achieve a final density of about 10 pcf to about 12 pcf. The foregoing parameters may vary by machine as would be apparent to one skilled in the art.

The dewatered cake 120 is then pressed in a pressing unit 130 (e.g., a pressing roll) to reduce the thickness of the dewatered cake 120 about 10% to about 50%, or preferably 10% to 25%, to a thickness of about ½ inch to about 1 inch to form the base mat 140. The pressing step further dewaters the base mat 140. The base mat 140 is then passed into a dryer 150, (e.g., a drying kiln) in which the moisture in the base mat is reduced to less than 5 wt %, preferably less than 2 wt %, and more preferably less than 1 wt %, which produces a dried base mat 160.

Optionally, the base mat 140 may be further dewatered with a vacuum dewatering unit (not shown) before introduction to the dryer 150. The dried base mat 160 is then cut by a blade 170 to form cut sheets 180 for acoustical tiles.

A benefit of the invention is the dried base mat 160 achieves NRC greater than 0.70 before any optional further processing such as adding a face coating, a back coating, or laminate. Further, with a back coating and not necessarily a face coating, face laminate, or face perforation, a CAC rating of about 30 to about 35 can be achieved. Thus, the acoustical tile of the present invention may have an absence of a face coating, a face laminate, and a face perforation.

The process for producing the acoustical tile can include a step to apply a back coating, typically at about 1.5 mils to about 2.0 mils, to the dried base mat 160 to improve the CAC rating. Before back coating, the dried base mat 160 can be ground or otherwise sanded to produce a relatively smooth surface.

Exemplary coatings for the back coating include latex-based coatings and resin-based coatings (e.g., a formaldehyde based resin such as a melamine-formaldehyde resin, a phenol-formaldehyde resin, or a urea-formaldehyde resin). Exemplary coatings include (1) a coating comprising calcium carbonate, clay and vinyl latex; (2) a coating comprising calcium carbonate, clay, vinyl latex, and glass beads; (3) a coating comprising a clay slurry; or (4) a coating comprising a clay and vinyl latex slurry; and the like. The coatings can be applied in an amount to achieve a surface weight (based on a dried weight of the coating) of about 5 grams per square foot (gsf) to about 40 gsf, preferably about 15 gsf to about 37 gsf, and more preferably about 25 gsf to about 37 gsf.

While not required, the process for producing the acoustical tile may include a step to apply a face coating or face laminate to the dried base mat 160 to further improve the NRC. Thus, optionally the dried base mat 160 described herein can be face coated with a paint-like coating, typically at about 1.5 mils to about 2.0 mils, to improve the resultant acoustical tile's light reflectance and appearance as a finished panel or tile as is customary in the industry. In some instances, a laminate (solid layer) like a non-woven fiberglass scrim may also be applied to the face of the dried base mat. Before face coating and/or laminating, the dried base mat 160 can be ground or otherwise sanded to produce a relatively smooth surface.

A further benefit of the invention is the dried base mat 160 achieves NRC greater than 0.70 without perforations and fissures. Thus, the acoustical tile of the present invention may have an absence of perforations and fissures. However, the face of the acoustical tile can optionally be perforated and fissured to further improve its sound absorption performance.

If desired, the process for producing the acoustical tile may yield a dried base mat 160 sufficiently smooth that the process may be absent a grinding or sanding step.

If desired, the process for producing the acoustical tile may be absent two or more of: a grinding or sanding step, a face coating step, a laminating step, and a perforating or fissuring step.

TABLE 1 lists compositions and the properties of the dried base mat of the invention and the compositions on a water free basis of the corresponding slurry where glass fibers are not in the slurry and dried base mat formulations. If a laminate, such as a fiberglass scrim or other laminate is added to the dried base mat, glass fibers may be present in the resultant acoustical tile.

TABLE 2 lists compositions and the properties of the dried base mat of the invention and the compositions on a water free basis of the corresponding slurry where glass fibers are in the slurry and dried base mat formulations.

In TABLES 1 and 2 each "Preferred" range or "More Preferred" range is individually a preferred range or more preferred range for the invention. Thus, any "Preferred" range can be independently substituted for a corresponding "Useable range". Likewise, any "More Preferred range" can be independently substituted for a corresponding "Useable" range or a corresponding "Preferred" range. However, it is desirable to use all preferred ranges of a table together. It is more desirable to use all more preferred ranges of a table together.

TABLE 1 glass fiber not in the slurry and dried base mat

| Component | Useable | Preferred | More Preferred |
|---|---|---|---|
| Compositions (wt % on a water free basis) | | | |
| Mineral Wool | 70 to 90 | 75 to 85 | 78 to 80 |
| Glass Fiber | 0 | 0 | 0 |
| Perlite | 5 to 15 | 7 to 12 | 8 to 10 |
| Starch | 0 to 10 | 1 to 5 | 2 to 4 |
| Latex | 3 to 10 | 5 to 9 | 6 to 8 |
| Total Starch and Latex | 7 to 13 | 8 to 12 | 9 to 11 |
| Gypsum | 0 to 5 | 0.5 to 3 | 0.5 to 2 |
| Properties | | | |
| NRC | 0.70 or greater | 0.75 or greater | 0.80 to 0.95 |
| CAC* | 30 to 35 | 31 to 34 | 31 to 32 |
| Thickness (in) | ½ to 1 | ⅝ to ⅞ | ¹¹⁄₁₆ to ¹³⁄₁₆ |
| Density (pcf) | 10 to 12 | 11 to 12 | 11 to 12 |

*CAC achieved when a back coating is present.

TABLE 2 glass fiber in the slurry and dried base mat

| Component | Useable | Preferred | More Preferred |
|---|---|---|---|
| Compositions (wt % on a water free basis) | | | |
| Mineral Wool | 60 to 90 | 70 to 85 | 75 to 80 |
| Glass Fiber | 0.1 to 10 | 0.1 to 5 | 0.5 to 3 |
| Total Mineral Wool and Glass Fiber | 70 to 90 | 75 to 85 | 78 to 80 |
| Perlite | 5 to 15 | 7 to 12 | 8 to 10 |
| Starch | 0 to 10 | 1 to 5 | 2 to 4 |
| Latex | 3 to 10 | 5 to 9 | 6 to 8 |
| Total Starch and Latex | 7 to 13 | 8 to 12 | 9 to 11 |
| Gypsum | 0 to 5 | 0.5 to 3 | 0.5 to 2 |
| Properties | | | |
| NRC | 0.75 or greater | 0.80 or greater | 0.85 to 0.95 |
| CAC* | 30 to 35 | 31 to 34 | 31 to 32 |
| Thickness (in) | ½ to 1 | ⅝ to ⅞ | ¹¹⁄₁₆ to ¹³⁄₁₆ |
| Density (pcf) | 10 to 12 | 11 to 12 | 11 to 12 |

*CAC achieved when a back coating is present.

Mineral Wool

The disclosed compositions contain mineral wool of the type conventionally used in acoustical tiles. Mineral wool in an acoustical tile increases the sound absorption (NRC) of the tile. In general, the higher the amount of mineral wool the better the sound absorption. Mineral wool also advantageously gives bulking to the slurry during formation of the core. Mineral wool, also known as mineral fiber, mineral cotton, mineral fiber, man-made mineral fiber (MMMF), and man-made vitreous fiber (MMVF), is a general name for fiber materials that are formed by spinning or drawing molten minerals (or "synthetic minerals" such as slag and ceramics). The mineral wool may be any of the conventional mineral fibers prepared by attenuating a molten stream of basalt, granite, or other vitreous mineral constituent. The molten mineral is either drawn linearly through orifices, commonly referred to as textile fiber, or it is recovered tangentially off the face of a spinning cup or rotor, commonly referred to as wool fiber. Preferably the mineral wool is slag wool or basalt wool. Slag wool is a mineral wool made usually from molten blast-furnace slag by the action of jets of steam under high pressure. Basalt fiber is a material made from extremely fine fibers of basalt, which is composed of the minerals plagioclase, pyroxene, and olivine. On a dry basis, the mineral wool constituent is present in an amount ranging from about 70 wt % to about 90 wt %, more preferably about 75 wt % to about 85 wt %, most preferably about 78 wt % to about 80 wt % in the products and processes of the present invention. Glass fibers are not mineral wool.

Typically, basalt wool fibers have a diameter of about 5 microns to about 10 microns. Further, commercially available basalt wool fibers include as much as 40% (e.g., about 20% to about 40%) unfiberized material, which is referred to in the art as shot. Typically, slag wool fibers have a diameter of about 2 microns to about 5 microns. Further, commercially available slag wool fibers can include above about 50% (e.g., about 30% to about 60%) shot. The mineral wool used in the inventive compositions and methods described herein may include shot at high concentrations that are typically commercially available or may have a reduced shot concentration achieved, for example, by passing the mineral wool through an air classifier.

Binder

The binder comprises latex and optionally starch and mixtures thereof.

Starch may or may not be cooked prior to use. A starch gel may be prepared by dispersing starch particles in water and heating the slurry until the starch is fully or partially cooked and the slurry thickens to a viscous gel. However, if conventional hydropulped fibers are used as a supplemental source of fiber, they may be incorporated into the starch slurry prior to cooking. The cooking temperature of the starch slurry should be closely monitored to assure the desired degree of swelling of the starch granules. The cooking temperature for cornstarch can range from about 160° F. (71° C.) to about 195° F. (90° C.). Starch may also be used as a binder without pre-cooking the starch, because it forms a gel during the process of drying the base mat. Cornstarch is the preferred binder.

Increased binder content, in the form of starch, can be used to increase strength (MOR—modulus of rupture (psi)) and hardness and enhance the cutability of the finished tiles/panels. On a dry basis, the starch is present from 0 wt % to about 10 wt %, preferably from about 1 wt % to about 5 wt %, more preferably from about 2 wt % to about 4 wt % in the products and processes of the present invention.

The latex may include acrylic binder, a polyester binder, an acrylo-polyester binder, and mixtures thereof.

On a dry basis, the latex is present from about 3 wt % to about 10 wt %, preferably about 5 wt % to about 9 wt %, more preferably about 6 wt % to about 8 wt % in the products and processes of the present invention.

The total binder (i.e., latex plus starch, if included) is present, on a dry basis, from about 7 wt % to about 13 wt %, preferably about 8 wt % to about 12 wt %, more preferably about 9 wt % to about 10 wt % in the products and processes of the present invention. For example, if starch is excluded from the binder, the latex is present at about 7 wt % to about 10 wt % in the products and processes of the present invention.

Perlite

An ingredient of the disclosed compositions is a perlite. Expanded perlite is preferred for its low cost and performance. The expanded perlite provides porosity and "loft" in the final product, which enhances acoustical properties.

Perlite is a form of glassy rock, similar to obsidian with the capacity to expand greatly on heating. Perlite generally contains 65 wt % to 75 wt % $SiO_2$, 10 wt % to 20 wt % $Al_2O_3$, 2 wt % to 5 wt % $H_2O$, and smaller amounts of sodium, potassium, iron and calcium oxides. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional process of preparing expanded perlite, the perlite ore is first ground to a fine size. The perlite is expanded by introducing the finely ground perlite ore into the heated air of a perlite expander. Typically the expander heats the air to about 1750° F. (955° C.). The finely ground perlite is carried by the heated air which heats the perlite and causes it to pop like popcorn to form the expanded perlite having a density of about 3 to 10 pounds per cubic foot. When expanded perlite is placed in contact with water, the water penetrates the cracks and fissures and enters into the air filled cavities of the perlite, thereby causing the perlite to retain large amounts of water within the expanded perlite particles.

Using the relatively high density perlite, i.e., a perlite which has been expanded to a density of over 7 or 8 pcf (versus the normal range of 3 to 5 pcf), lowers the water needed to form a suitable slurry. See, U.S. Pat. No. 5,911,818 to Baig. The aqueous slurry with less water requires less dewatering, and produces a base mat having less water retained by the perlite. The resulting product has improved compressive resistance and maintained fire ratings, as defined by ASTM E119-16a. The base mat having a lower water content can be dried faster which allows the entire water felting line to be run at higher speed.

High density perlite is also beneficial when manufacturing fire rated acoustical tiles that must meet a minimum density. However, when the density of the expanded perlite exceeds about 20 pdf, the perlite does not produce as much "loft" or bulk in the final product. As a result, the density of the final product may be too high to maintain the low thermal conductivity required to pass the ASTM E119 fire endurance test.

On a dry basis, the perlite, of either the high or low density type, is present from about 5 wt % to about 15 wt %, preferably about 7 wt % to about 12 wt %, more preferably about 8 wt % to about 10 wt % in the products and processes of the present invention.

Gypsum

Gypsum is a commonly used low cost inorganic material in acoustical tiles and related base mat and slurry compositions. The gypsum is calcium sulfate dihydrate, $CaSO_4.2H_2O$. Gypsum has limited solubility in water and acts as a flocculent. By functioning as a flocculent in the slurry, the gypsum helps to retain and uniformly distribute the fine particles (inorganic clay, organic starch, short cellulosic fibers, etc.) in the mat during the processing (dewatering, vacuum and wet pressing).

Gypsum may optionally be included in the products and processes of the present in. When included, gypsum is present, on a dry basis, from 0 wt % to about 5 wt %, preferably about 0.5 wt % to about 3 wt %, more preferably about 0.5 wt % to about 2 wt % in the products and processes of the present invention. In some instances, acoustical tiles of the invention, as well as the dried base mat and the slurry in the process for making the acoustical tile of the invention, can an absence of gypsum, if desired.

Additives

Glass fiber may optionally be included in the products and processes of the present invention to further increase the NRC of the dried base mat and acoustical tile of the invention. When included, glass fiber is present, on a dry basis, from about 0.1 wt % to about 10 wt %, preferably about 0.1 wt % to about 5 wt %, more preferably about 0.5 wt % to about 3 wt % in the products and processes of the present invention. Preferably, acoustical tiles of the invention, as well as the dried base mat and the slurry in the process for making the acoustical tile of the invention, have an absence of glass fiber.

The acoustical tile of the invention, as well as the dried base mat and the slurry in the process for making the acoustical tile of the invention, preferably has an absence of polymer fibers unless included in a coating or laminate.

The acoustical tile of the invention, as well as the dried base mat and the slurry in the process for making the acoustical tile of the invention, preferably has an absence of organic fibers (e.g., cellulosic fibers, paper fibers, and newsprint) unless included in a coating or laminate.

The acoustical tile of the invention, as well as the dried base mat and the slurry in the process for making the acoustical tile of the invention, preferably has an absence of glass beads unless included in a coating or laminate.

The acoustical tile of the invention, as well as the dried base mat and the slurry in the process for making the acoustical tile of the invention, preferably has an absence of clay unless included in a coating or laminate.

The acoustical tile of the invention, as well as the dried base mat and the slurry in the process for making the acoustical tile of the invention, preferably has an absence of vermiculite unless included in a coating or laminate.

The acoustical tile of the invention, as well as the dried base mat and the slurry in the process for making the acoustical tile of the invention, preferably has an absence of calcium carbonate unless included in a coating or laminate.

The acoustical tile of the invention, as well as the dried base mat and the slurry in the process for making the acoustical tile of the invention, preferably has an absence of magnesium carbonate unless included in a coating or laminate.

The acoustical tile of the invention, as well as the dried base mat and the slurry in the process for making the acoustical tile of the invention, preferably has an absence of zinc pyrithione unless included in a coating or laminate.

Preferably the acoustical tile of the invention, as well as the dried base mat and the slurry in the process for making the acoustical tile of the invention, has an absence of all the following ingredients: glass beads, polymer fibers, organic fibers, clay, vermiculite, calcium carbonate, and magnesium carbonate unless included in a coating or laminate. In some instances, the acoustical tile of the invention, as well as the dried base mat and the slurry in the process for making the acoustical tile of the invention, if further absent gypsum, glass fibers, or both gypsum and glass fibers unless included in a coating or laminate.

Preferably the acoustical tile of the invention, as well as the dried base mat and the slurry of the process for making the acoustical tile of the invention, on a water free basis, has an absence of inorganic material other than perlite, gypsum, and mineral wool and optionally glass fibers unless included in a coating or laminate. More preferably the acoustical tile of the invention, as well as the base mat and the acoustical tile and the slurry of the process for making the acoustical tile of the invention, on a water free basis, has an absence of inorganic material other than perlite and mineral wool unless included in a coating or laminate. These exclusions are on a water free basis so it does not exclude water.

Properties

Preferably the acoustical tile of the invention, as well as the dried base mat of the invention, has an NRC of about 0.70 or greater (e.g., about 0.70 to about 0.90), preferably about 0.75 or greater (e.g., about 0.75 to about 0.90), more preferably about 0.80 or greater (e.g., about 0.80 to about 0.90) for versions without glass fibers in the slurry or base mat. Versions with the glass fibers in the slurry or base mat have a useable NRC of about 0.75 to about 0.95, preferably 0.80 to about 0.95, and most preferably about 0.85 to about 0.95.

Preferably the acoustical tile of the invention, as well as the dried base mat with a back coating of the invention, has a CAC of about 30 to about 35, preferably about 31 to about 34, more preferably about 31 to about 32.

Preferably the acoustical tile of the invention, as well as the dried base mat of the invention, has a thickness of about ½ in (12.7 mm) to about 1 in (25.4 mm), preferably about ⅝ in (15.9 mm) to about ⅞ in (22.2 mm), more preferably about 11/16 in (17.5 mm) to about 13/16 in (20.6 mm).

Preferably the acoustical tile of the invention, as well as the dried base mat of the invention, has a density of about 10 pd (pounds per cubic foot) pd (160 kg/m$^3$) to about 12 pd (192 kg/m$^3$), more preferably about 11 pd (176 kg/m$^3$) to about 12 pcf (192 kg/m$^3$).

The following examples are presented to further illustrate some preferred examples of the invention and to compare them with conventional methods and compositions outside the scope of the invention. The invention is not limited by the following examples but rather is defined by the claims appended hereto.

EXAMPLES

Example 1

Dried base mats were prepared by the wet felting process described in FIG. 2 and according to the formulations and specifications in TABLE 3 where the mineral wool is slag wool. A back coating of 10 gsf clay slurry and 14 gsf clay and vinyl latex slurry was applied to the dried base mats.

TABLE 3

| | Mineral Wool (wt %) | Perlite (wt %) | Starch (wt %) | Latex (wt %) | Gypsum (wt %) | Density (pcf) | Thickness (in) |
|---|---|---|---|---|---|---|---|
| Control Base Mat | 79.0 | 9.0 | 3.5 | 7.0 | 1.5 | 15 | 5/8; 3/4 |
| Inventive Base Mat A | 79.0 | 9.0 | 3.5 | 7.0 | 1.5 | 11.5 | 15/16; 7/8; 3/4 |

The inventive base mats were cut into 2 ft by 2 ft acoustical tiles. The acoustic properties were tested for (1) tiles having only the back coating), (2) tiles having the back coating and 30 gsf face coating comprising calcium carbonate, clay, and vinyl latex (described in U.S. Pat. No. 9,040,153), and (3) tiles having the back coating and the face coating of (2) with a glass scrim (an oriented fiber fabric) applied. The glass scrim does not affect the CAC. TABLE 4 provides the acoustic testing results of several trials of the inventive acoustical tiles. The control acoustical tiles have an NRC of about 50 to about 55.

TABLE 4

| Sample | Thickness | Finishing | NRC (CNRC**) | CAC |
|---|---|---|---|---|
| A-1 | 15/16 in (unground) | Back Coating | 0.7254 (0.75) | * |
| A-2 | | Back Coating and Face Coating | 0.7898 (0.80) | * |
| A-3 | 7/8 in (ground) | Back Coating | 0.7562 (0.75) | * |
| A-4 | | Back Coating and Face Coating | 0.7559 (0.75) | * |
| A-5 | | Back Coating, Face Coating, and Glass Scrim | 0.7497 (0.75) | about 32 |
| A-6 | 3/4 in (ground) | Back Coating | 0.7474 (0.75) | * |
| A-7 | | Back Coating and Face Coating | 0.7378 (0.75) | * |
| A-8 | | Back Coating, Face Coating, and Glass Scrim | 0.7855 (0.80) | * |

\* not tested, but expected to be at about 30 to about 35
\*\*corrected noise reduction coefficient The physical properties of the A-7 acoustical tiles were measured according to ASTM C367-16. In particular, the boards were tested for the Physical Test Results of Modulus of Rupture (MOR)(psi), Modulus of Elasticity (MOE) (psi), and 2 inch Ball Hardness (lb-f) according to ASTM C367-16. For Hardness the tests conformed to the basic testing parameters of this standard. Loss on Ignition (LOI)(%) was measured after heating the sample to 1000° F. (538° C.) for about 30 minutes. MOE refers to "Modulus of Elasticity" and is a measure of the relative stiffness of the test sample. A sample with a higher MOE value will deflect less under a given load.

TABLE 5 provides the physical testing results of the A-7 acoustical tiles. Similar results were observed for the A-2 and A-4 acoustical tiles and are not reported here.

TABLE 5

| Sample | Finished Density (pcf) | Hardness (lbs) | Modulus of Rupture (MOR) (psi) | Modulus of Elasticity (MOE) (psi) | Loss On Ignition (LOI) (%) | Sag (inches) |
|---|---|---|---|---|---|---|
| A-7 | 11.97 | 41.63 | 72.73 | 12289 | 12.6 | 0.119 |

Example 2

11/16 inch (17.5 mm) dried base mats were prepared by the wet felting process described in FIG. 2 and according to the formulations and specifications in TABLE 3 from EXAMPLE 1 with either slag wool or basalt wool. The dried base mats were then pressed to either a thickness of 3/4 inch (17.5 mm) or 5/8 inch (15.9 mm). The pressed base mats were (A) back coated with 10 gsf clay slurry and 14 gsf clay and vinyl latex slurry and (B) face coated with either Coating 1 comprising calcium carbonate, clay, and vinyl latex described in COMPARATIVE EXAMPLE 1 or Coating 2 comprising calcium carbonate, clay, vinyl latex, and glass beads. TABLE 6 provides the acoustic testing results of several trials of the inventive acoustical tiles, and TABLE 7 provides the physical properties of the inventive acoustical tiles.

TABLE 6

| Sample | Thickness | Wool Type | Finishing | NRC (CNRC) | CAC |
|---|---|---|---|---|---|
| A-9 | 3/4 in | Slag Wool | Face Coating 1 and Back Coating | 0.7403 (0.75) | * |
| A-10 | 3/4 in | Basalt Wool | Face Coating 1 and Back Coating | 0.7836 (0.80) | 31 |
| A-11 | 3/4 in | Basalt Wool | Face Coating 2 and Back Coating | 0.7799 (0.80) | * |
| A-12 | 7/8 in | Basalt Wool | Face Coating 1 and Back Coating | 0.7926 (0.80) | 33 |

\* not tested, but expected to be at about 30 to about 35
\*\* corrected noise reduction coefficient

TABLE 7

| Sample | Finished Density (pcf) | MOR (psi) | Hardness (lbs) | Sag (in) |
|---|---|---|---|---|
| A-9 | 12.49 | 98.28 | 50.34 | 0.01 |
| A-10 | 12.84 | 86.78 | 50.32 | 0.01 |
| A-11 | 13.10 | 84.18 | 48.04 | 0.02 |
| A-12 | 12.32 | 91.58 | 50.23 | 0.01 |

Example 3

2 foot by 2 foot (61 cm×61 cm) acoustical tiles B-1 and B-2 of the Inventive Base Mat B composition (see TABLE 8) with 3/4 in (1.9 cm) thickness were coated with (A) a back coating of 10 gsf clay slurry and 14 gsf clay and vinyl latex slurry and (B) a face coating comprising calcium carbonate, clay, and vinyl latex described in COMPARATIVE EXAMPLE 1 at a surface weight (based on a dried weight of the coating) of either 30 gsf (grams per square foot) (323 grams per square meter) or 45 gsf (484 grams per square meter).

TABLE 9 provides the acoustical and physical properties of the two acoustical tiles B-1 and B-2. The results illustrate that increasing the face coating weight decreased the NRC of the acoustic ceiling tile where B-2 with a 45 gsf face coating falls outside the present invention.

TABLE 8

| | Basalt Wool (wt %) | Perlite (wt %) | Starch (wt %) | Latex (wt %) | Gypsum (wt %) | Density (pcf) |
|---|---|---|---|---|---|---|
| Inventive Base Mat B | 68.0 | 20.0 | 3.5 | 7.0 | 1.5 | 11.5 |

TABLE 9

| Sample | Face Coating Weight (gsf) | NRC (CNRC) | CAC | Hardness (lbs) | MOR (psi) | MOE (psi) | LOI (%) | Sag (in) |
|---|---|---|---|---|---|---|---|---|
| B-1 | 30 | 0.6889 (0.70) | 35 | 66.94 | 88.30 | 15900 | 17.43 | 0.119 |
| B-2 | 45 | 0.6025 (0.60) | 35 | 57.80 | 81.70 | 18767 | 16.92 | 0.110 |

While particular versions of the invention have been shown and described, it will be appreciated by those skilled in the art that changes and modifications may be made thereto without departing from the invention in its broader aspects and as set forth in the following claims.

What is claimed is:

1. An acoustical the comprising a dried base mat comprising:
   78 wt % to 80 wt % mineral wool;
   8 wt % to 10 wt % perlite;
   2 wt % to 4 wt % starch, wherein the starch is a starch binder for the base mat;
   6 wt % to 8 wt % latex, wherein the latex is a latex binder for the base mat;
   0.5 wt % to 3 wt % gypsum; and
   less than 5 wt % water, wherein the dried base mat has an absence of glass fibers; and
   wherein the dried base mat without a laminate layer; without a coating, and without perforations has a noise reduction coefficient (NRC) of about 0.70 to about 0.75, a density of about 11 pounds per cubic foot (pcf) to about 12 pcf, and a thickness of about ⅝ inch to about ⅞ inch;
   wherein the dried base mat was made from drying a slurry comprising water and ingredients comprising on a water free basis:
   said mineral wool;
   said perlite;
   said starch;
   said latex; and
   said gypsum.

2. The acoustical tile of claim 1, wherein the dried base mat without a laminate layer, without the coating, and without perforations has a noise reduction coefficient (NRC) of about 0.75.

3. The acoustical tile of claim 1, has an absence of a face coating and an absence of a back coating.

4. The acoustical tile of claim 1, wherein a face of the acoustical tile has perforations, wherein the acoustical tile has a front side and a rear side, wherein the acoustical tile has an absence of a laminate layer on its front side, and wherein the acoustical tile has an absence of a laminate layer on its rear side.

5. The acoustical tile of claim 1, wherein the dried base mat, without the laminate layer or coating and without the perforations, has the thickness of about 11/16 inch to about 13/16 inch.

6. A process for manufacturing the acoustical tile of claim 1 in a water felting process comprising:
   mixing an aqueous slurry comprising water and ingredients comprising on a water free-basis:
   78 wt % to 80 wt % mineral wool;
   8 wt % to 10 wt % perlite;
   2 wt % to 4 wt % starch;
   6 wt % to 8 wt % latex; and
   0.5 wt % to 3 wt % gypsum;
   continuously flowing the aqueous slurry onto a moving foraminous support wire to form a filter cake;
   dewatering the filter cake to form a base mat which includes pressing the filter cake to the thickness of about ⅝ inch to about ⅞ inch; and
   drying the base mat to produce the dried base mat that without the laminate layer, without the coating and without the perforations has the NRC of about 070 to about 0.75, a density of about 11 pounds per cubic foot (pcf) to about 12 pcf, and a thickness of about ⅝ inch to about ⅞ inch,
   wherein the aqueous slurry and the dried base mat have an absence of glass fibers.

7. The process of claim 6, further comprising applying a back of the acoustical tile with a coating a coating at a surface weight of about 5 grams per square foot (gsf) to about 40 gsf to the dried base mat, wherein the acoustical tile has the CAC rating of about 30 to about 35.

8. The process of claim 6, further comprising applying a face of the acoustical tile with a coating at a surface weight of about 5 gsf to about 40 gsf to the dried base mat.

9. The process of claim 6, further comprising perforating a face of the acoustical tile.

10. The process of claim 6, wherein the dried base mat, without the laminate layer or coating and without the perforations, has the NRC of about 0.75, and the density of about 11 pcf to about 12 pcf.

11. The process of claim 6, wherein the aqueous slurry and has an absence of one or more of: polymer fibers and organic fibers.

12. The process of claim 6, wherein the dried base mat consists of the mineral wool, the perlite, the latex, and less than about 5 wt % water.

13. The process of claim 6, wherein the dried base mat consists of the mineral wool, the perlite, the starch, the latex, and less than about 5 wt % water.

14. An acoustical the comprising a dried base mat comprising:
   70 wt % to 85 wt % mineral wool;
   7 wt % to 12 wt % perlite;
   1 wt % to 5 wt % starch, wherein the starch is a starch binder for the base mat;
   5 wt % to 9 wt % latex; wherein the latex is a latex binder for the base mat;
   0 wt % to 3 wt % gypsum;
   0.1 wt % to 5 wt % glass fibers; and
   less than 5 wt % water; and
   wherein the dried base mat without a laminate layer; without a coating and without perforations has a noise reduction coefficient (NRC) of about 0.75, a density of about 10 to about 12 pcf, and a thickness of about ½ inch to about 1 inch;
   wherein the dried base mat was made from drying a slurry comprising water and ingredients comprising on a water free basis:
   said mineral wool;
   said perlite;
   said starch;
   said latex;
   said gypsum; and
   said glass fibers.

15. A process for manufacturing the acoustical tile of claim 14 in a water felting process comprising:
   mixing an aqueous slurry comprising water and ingredients comprising on a water free-basis:
   70 to 85 wt % mineral wool, 7 to 12 wt % perlite, 1 to 5 wt % starch, wherein the starch is starch binder for the base mat, 5 to 9 wt % latex, wherein the latex is latex binder for the base mat, 0.5 to 3 wt % gypsum, and 0.1 to 5 wt % glass fibers;
   continuously flowing the aqueous slurry onto a moving foraminous support wire to form a filter cake;
   dewatering the filter cake to form a base mat which includes pressing the filter cake to the thickness of about ½ inch to about 1 inch; and
   drying the base mat to produce the dried base mat, the density of about 10 pcf to about 12 pcf, and the thickness of about ½ inch to about 1 inch.

16. The process of claim 15, further comprising applying a back of the acoustical tile with a coating a coating at a surface weight of about 5 grams per square foot (gsf) to about 40 gsf to the dried base mat, wherein the acoustical tile has the CAC rating of about 30 to about 35;
   wherein the slurry comprises on a water free basis:
   75 to 80 wt % mineral wool;
   8 to 10 wt % perlite;
   2 to 4 wt % starch, wherein the starch is starch binder for the base mat;
   6 to 8 wt % latex, wherein the latex is latex binder for the base mat;
   0.5 to 2 wt % gypsum;
   0.1 to 3 wt % glass fibers;
   wherein the density of the dried base mat without the laminate layer, without the coating, and without the perforations is 11 to 12 pcf.

17. The process of claim 15, wherein the aqueous slurry and has an absence of one or more of: polymer fibers and organic fibers and the acoustical tile has a front side and a rear side and an absence of a laminate on its front side and an absence of a laminate on its rear side.

18. The process of claim 6, wherein the dried base mat consists of the mineral wool, the perlite, the starch, the latex, the gypsum, and less than 5 wt % water and the acoustical tile has an absence of a face coating.

19. The process of claim 15, wherein the dried base mat consists of the mineral wool, the glass fiber, the perlite, the starch, the latex, the gypsum, and less than 5 wt % water.

* * * * *